United States Patent
Hausmann

(10) Patent No.: US 6,686,850 B2
(45) Date of Patent: Feb. 3, 2004

(54) SYSTEM OF PITCH ATTITUDE SYMBOLS

(75) Inventor: Wolfgang Hausmann, Wolfenbüttel (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 170 days.

(21) Appl. No.: 10/052,630

(22) Filed: Jan. 23, 2002

(65) Prior Publication Data

US 2002/0145543 A1 Oct. 10, 2002

(30) Foreign Application Priority Data

Jan. 23, 2001 (DE) ......... 101 02 938

(51) Int. Cl.$^7$ ............ G08B 23/00
(52) U.S. Cl. ......... 340/967; 340/975; 340/980; 701/4
(58) Field of Search ........ 340/467, 974, 340/975, 976, 973, 964, 980; 701/3, 4, 5, 6, 8, 9, 14, 15, 16; 342/439; 434/43; 345/204, 10

(56) References Cited

U.S. PATENT DOCUMENTS

| | | | |
|---|---|---|---|
| 3,309,659 A | 3/1967 | Balding | 340/979 |
| 3,331,069 A | 7/1967 | Cornell et al. | 342/152 |
| 3,345,632 A | 10/1967 | Rover et al. | 342/409 |
| 3,486,010 A | 12/1969 | Pressiat | 701/16 |
| 3,569,926 A | 3/1971 | Korn et al. | 340/974 |
| 3,639,034 A | 2/1972 | La Russa | 353/26 R |
| 3,711,826 A * | 1/1973 | La Russa | 340/980 |
| 4,247,843 A * | 1/1981 | Miller et al. | 340/973 |
| 4,283,705 A * | 8/1981 | James et al. | 340/973 |
| 4,419,079 A * | 12/1983 | Georges et al. | 434/43 |
| 4,626,851 A * | 12/1986 | Tooze | 340/975 |
| 4,740,779 A * | 4/1988 | Cleary et al. | 345/7 |
| 4,860,007 A * | 8/1989 | Konicke et al. | 340/973 |
| 4,903,017 A * | 2/1990 | Wooller | 340/975 |
| 5,198,812 A * | 3/1993 | Probert | 340/975 |
| 5,248,968 A * | 9/1993 | Kelly et al. | 340/961 |
| 5,289,185 A * | 2/1994 | Ramier et al. | 340/971 |
| 5,337,048 A * | 8/1994 | Penwill | 340/975 |
| 5,486,821 A * | 1/1996 | Stevens et al. | 340/970 |
| 5,675,328 A * | 10/1997 | Coirier et al. | 340/975 |
| 5,798,713 A * | 8/1998 | Viebahn et al. | 340/974 |
| 6,054,937 A * | 4/2000 | Von Viebahn et al. | 340/961 |
| 6,111,526 A * | 8/2000 | Aymeric et al. | 340/972 |
| 6,150,960 A * | 11/2000 | Voulgaris | 340/975 |
| 6,320,579 B1 * | 11/2001 | Snyder et al. | 345/419 |
| 6,356,266 B1 * | 3/2002 | Strickling, III | 345/440.1 |
| 6,473,676 B2 * | 10/2002 | Katz et al. | 701/4 |

FOREIGN PATENT DOCUMENTS

DE 1481989 7/1973

OTHER PUBLICATIONS

"Head–Up Displays—Designing the Way Ahead" by Richard L. Newman, Avebury Aviation, Ashgate Publishing Ltd., Gower House, Croft Road, Aldershot, Hants Gu11 3HR, England, ISBN 0–291–39–811–1 (1995).

* cited by examiner

Primary Examiner—Benjamin C. Lee
(74) Attorney, Agent, or Firm—Crowell & Moring LLP

(57) ABSTRACT

A system of pitch attitude symbols, which can be generated by a head-up display unit of an air vehicle, is provided. The system of pitch attitude symbols can be displayed by the head-up display as a virtual image in the direction of flight, behind the cockpit screen in a focal plane in front of the background. An unequivocal system of pitch attitude symbols is provided for the pilot, for a display area of an HUD, which display area is arranged below the natural horizon during neutral flight attitude of an air vehicle. Within the focal plane, the system of pitch attitude symbols comprises at least one pitch attitude representation area, arranged in perspective, which pitch attitude representation area can always be arranged parallel to the surface of the earth. The rear edge of the pitch attitude representation area is tiltably fixed in a rear edge axis and, depending on the pitch attitude of the air vehicle, the pitch attitude representation area can be tilted on the focal plane. The front edge shows the pitch attitude in relation to an angular-degree scale.

7 Claims, 5 Drawing Sheets

Fig. 4
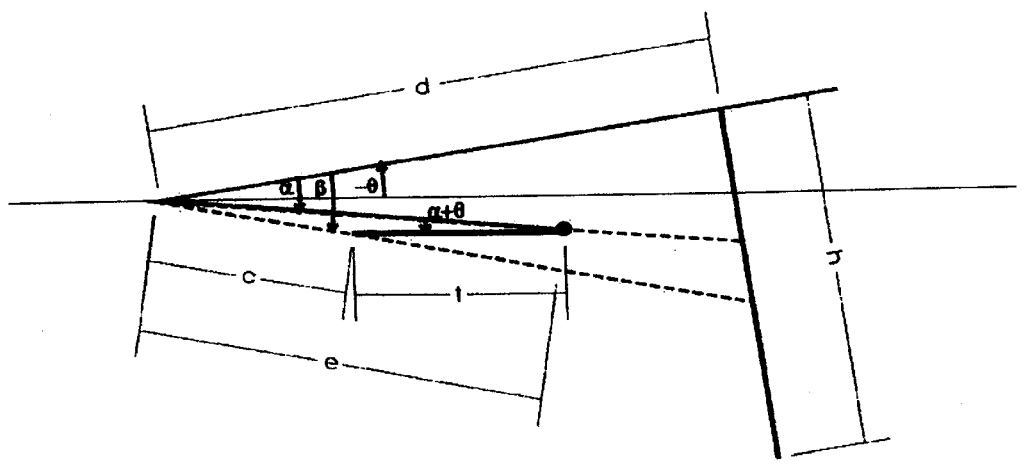
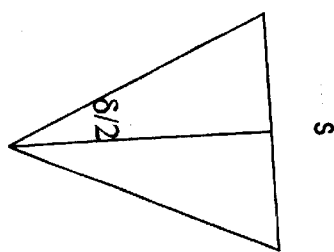
c bzw. e

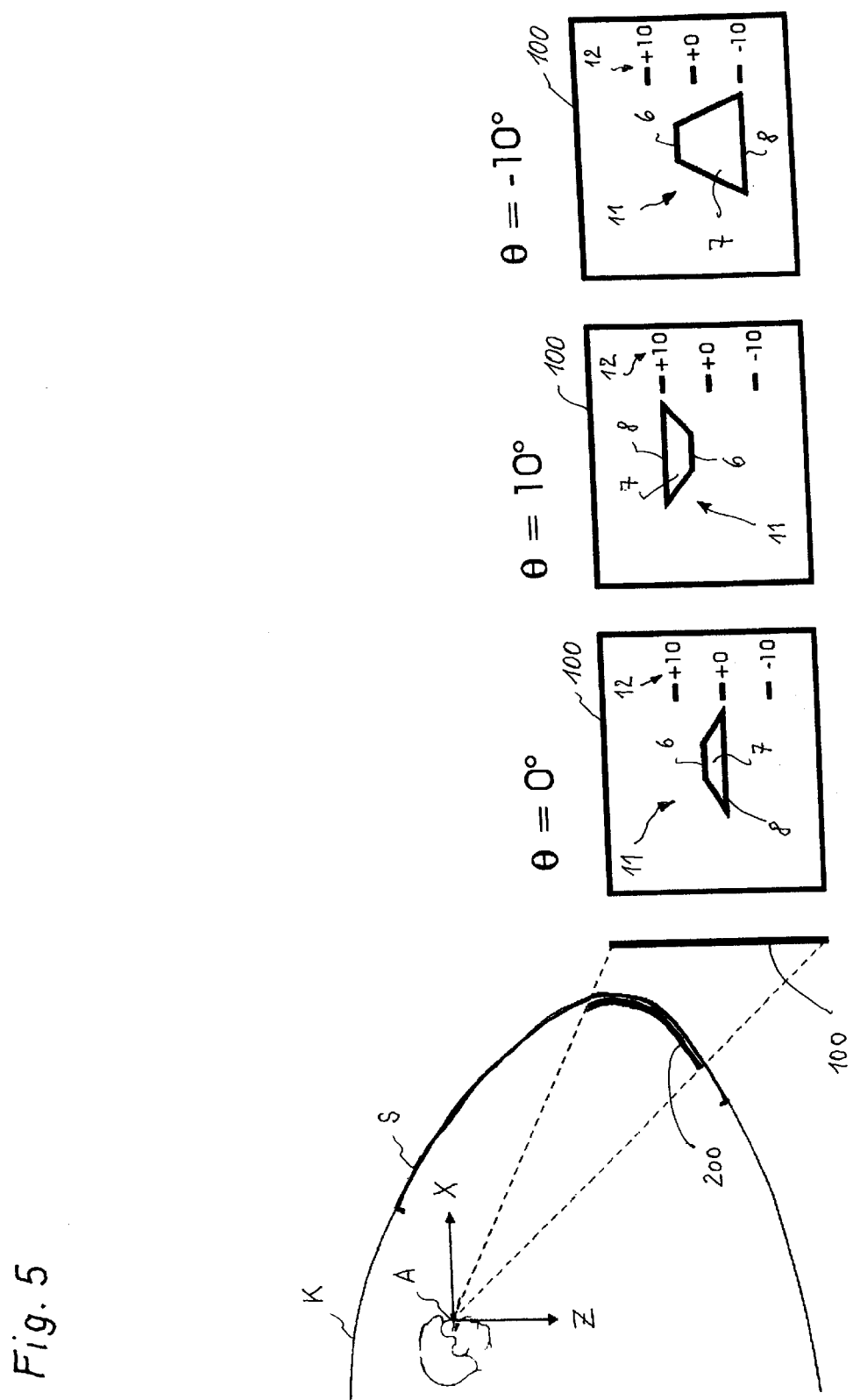

SYSTEM OF PITCH ATTITUDE SYMBOLS

BACKGROUND AND SUMMARY OF THE INVENTION

This application claims the priority of German Application No. 101 02 938.1, filed Jan. 23, 2001, the disclosure of which is expressly incorporated by reference herein.

The invention relates to a system of pitch-attitude symbols, which can be generated by a head-up display unit of an aircraft. The system of pitch attitude symbols can be displayed by the head-up display as a virtual image in the direction of flight, behind the cockpit screen in a focal (image) plane in front of the background.

During flight at night or in adverse meteorological conditions such as e.g. fog or rain, pilots of an aircraft, e.g. a fixed wing aircraft or a rotary wing aircraft, require so-called flight control aids in the cockpit. These flight control aids are, in particular, indispensable during flight at low altitude. Such flight control aids include a so-called head-up display (HUD) unit.

The term head-up display unit refers to a technical unit by which artificial, i.e. technically generated display contents, are superimposed onto the direct, natural field of vision of the pilot. This HUD unit comprises at least one symbol generator for calculating the required flight symbols, and a projector, which on the basis of the calculation generates the flight symbols and then projects them onto a head-up display (of a display area), i.e. an optically semi-transparent screen which shows a virtual image, e.g. flight symbols. The head-up display corresponds to this display area. This display area (e.g. as an optically semi-transparent screen) enables the pilot to look at the outside world through this display area while at the same time obtaining a generated virtual image in the focal plane, in the direction of view and at a distance from his/her eyes. The virtual image makes it possible for the pilot to view the generated flight symbols and the outside world concurrently, without necessitating accommodation (refocusing the lens of the eye). The virtual image arises outside the cockpit windscreen (from the point of view of the pilot). This virtual image is not based on pixels but as a linear graphic in the focal plane.

The display surface (also called head-up display, HUD) is an essential functional element of the entire HUD unit which is arranged in the direction of vision of the pilot, with the system of flight symbols being mirrored onto said HUD, with the pilot then seeing the flight symbols outside the cockpit windscreen.

In the publication Richard L. Newman, *Head-Up-Displays—Designing the Way Ahead,* Avebury Aviation, Ashgate Publishing Ltd., Gower House, Croft Road, Aldershot, Hants GU11 3HR, England, ISBN 0-291-39 811-1 (1995), the contents of which are incorporated by reference herein as non-essential matter, known flight symbols for flight control using a head-up display are explained. Below, preferably the system of flight attitude symbols, i.e. a system of pitch attitude symbols, will be discussed. Any references in the following text to flight attitude, refers specifically to pitch attitude.

The arrangement of the HUD is related to the context of the three spatial axes of an aircraft. The imaginary spatial axis which can be arranged in longitudinal direction of the aircraft, is the longitudinal axis of the aircraft, also known as the longitudinal axis X. When the aircraft is positioned horizontally on the surface of the earth, the longitudinal axis X of the aircraft points to the natural horizon. The pilot's point of sight is also located on longitudinal axis X. The longitudinal axis X and the natural horizon are almost congruent. This position of the aircraft also applies to horizontal flight. Horizontal flight corresponds to a neutral flight attitude.

In relation to horizontal flight, the head-up display is arranged in the cockpit so that it is positioned in the direction of the longitudinal axis X, i.e. so that the natural horizon can essentially be artificially indicated in the middle of the display area. The natural horizon is indicated by the neutral line (horizon line) within a so-called pitch ladder. This is essentially a graphic symbol (e.g. line symbol). The neutral line of this pitch ladder is always at the same height as the natural horizon. Within the pitch ladder, the HUD also shows the aircraft symbol, indicated by a two-part horizontal bar. The aircraft symbol is located on the longitudinal axis X of the aircraft. The aircraft symbol indicates the fictitious penetration point of the imaginary longitudinal axis X through the HUD. The pilot needs to move the aircraft symbol to the neutral line to move to horizontal flight. When the aircraft leaves horizontal flight, the aircraft symbol acts as a fixed reference mark, with the neutral line of the pitch ladder shifting in relation to the aircraft symbol.

The pitch attitude is thus one of the important items of flight control information which a pilot requires for controlling the air vehicle. As is known, the system of pitch attitude symbols is formed by the neutral line of a pitch ladder and the aircraft symbol being stationary as a reference. The two together form the pitch attitude symbol.

By means of an angular-degree scale which can be shown in addition, the pilot can recognize the pitch attitude of the air vehicle relative to the horizon, from the difference between the aircraft symbol and the neutral line.

The landing approach of an aircraft represents a critical flight phase which requires increased attention and precise pilot action. In view of this it may be sensible to arrange the HUD lower in relation to the fixed longitudinal axis X, i.e. in close proximity to the lower border of the pilot's field of vision. This would take better account of the typical direction of vision during approach for landing. This poses a problem in that during horizontal flight, both the neutral line and the aircraft symbol, are located above the display area of the HUD. Conventional indication of the pitch attitude is thus no longer possible.

It would be possible to shift the pitch ladder with the neutral line (which up to now was identical to the natural horizon line) below the horizon line too. This would mean giving up the reference to the true, natural horizon. However, this is not customary in the case of aircraft. It could lead to misinterpretation of the true flight attitude (pitch attitude) and thus to the introduction of uncontrolled flight situations.

In an arrangement of the display area of an HUD below the natural horizon (during neutral flight attitude) there is a problem in that the conventional system of pitch attitude symbols is no longer possible, because said system always relates to the horizon.

It is thus the object of the invention, to provide an unequivocal system of pitch attitude symbols for the pilot, for a display area of an HUD, which display area during neutral flight attitude of an aircraft is arranged below the natural horizon.

This object is met in that within the focal plane the system of pitch attitude symbols comprises at least one pitch attitude representation area, arranged in perspective, which pitch attitude representation area can always be arranged parallel to the surface of the earth, wherein the rear edge of the pitch attitude representation area is tiltably fixed in a rear edge axis. And, depending on the pitch attitude of the aircraft, the pitch attitude representation area can be tilted in the focal plane, with the front edge showing the pitch attitude in relation to an angular-degree scale.

The system of pitch attitude symbols has the advantage that its interpretation is intuitive. It has an unconventional appearance so that any danger of mistaking it for conventional elements can be excluded.

The pitch attitude representation area has the advantage that it can be shown in correct perspective, directly relative to the background (terrain and/or sky). Because of this the entire image has a consistent appearance. Furthermore, the perspective representation of the pitch attitude representation area results in optical foreshortening ("compression") of the angular area displayed. Thus a relatively large angle can be shown on a small display area of the HUD unit.

The system of pitch attitude symbols is associated with the following advantages: (1) the pitch attitude information does not relate to the horizon; (2) the zero position reference is always situated within the display region; (3) the system of symbols is more coherent than is the case with the state of the art, thus making the display more legible; and (4) the pitch attitude information can be positioned anywhere in the display area.

Advantageously, the pitch attitude representation area can be shown with a zero position reference area, wherein the rear edge of the zero position reference area is fixed and united with the rear edge of the pitch attitude representation area, wherein the zero position reference area is fixed with its front edge indicating the position of the neutral line.

The system of pitch attitude symbols can be freely positioned in the focal plane.

According to a further embodiment, a system of roll attitude symbols can be shown above the system of pitch attitude symbols. The system of roll attitude symbols is represented by a movable line symbol and a fixed triangle symbol.

Other objects, advantages and novel features of the present invention will become apparent from the following detailed description of the invention when considered in conjunction with the accompanying drawings.

BRIEF DESCRIPTION OF THE DRAWINGS

FIG. 4 shows geometric relationships at the pitch attitude representation area; and FIG. 5 shows an arrangement of the display area of the head-up display, offset in relation to the longitudinal axis X, with the system according to the invention, of pitch attitude symbols on the focal plane at different flight attitudes.

DETAILED DESCRIPTION OF THE DRAWINGS

Figure 1:
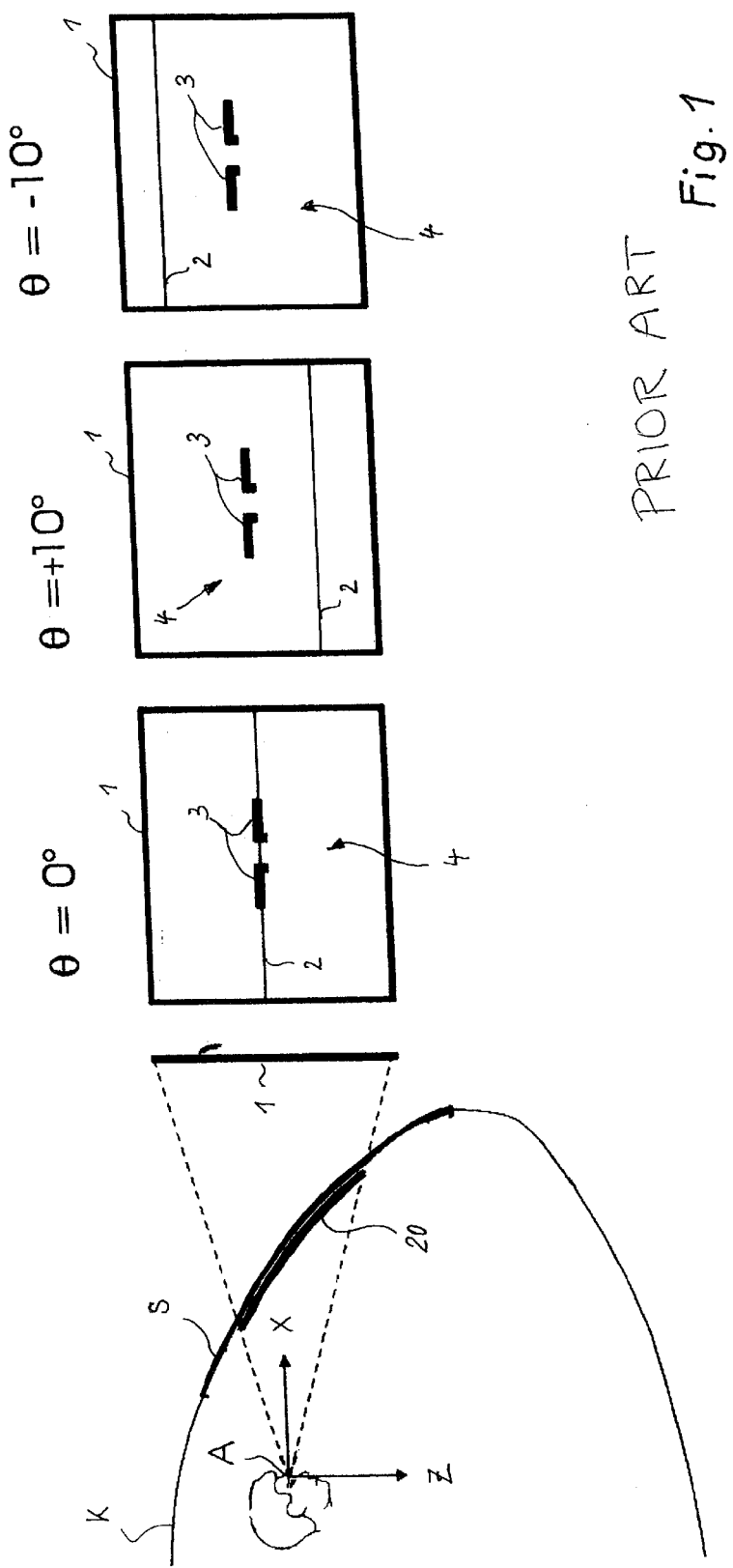
FIG. 1 shows an arrangement of a display area of a head-up display with a system of pitch attitude symbols, and a representation in the focal plane with different flight attitudes, according to the state of the art.

FIG. 1 shows the contour K of part of a cockpit of a helicopter; the cockpit windscreen S and the display area 20 (HUD) are shown. The helicopter's co-ordinates system explained below is based on the point of sight A of the pilot. The axis which is aligned in longitudinal direction of the helicopter corresponds to the longitudinal axis X of the helicopter. The vertical axis which is arranged perpendicular to said longitudinal axis corresponds to the vertical axis Z. Axis Y which is the transverse axis is not shown because it does not contribute anything to the explanation.

The longitudinal axis X points to the natural horizon line 2. In the direction of view of the pilot, a virtual image is mirrored-in through the HUD unit, at a distance to the point of sight A. The virtual image is visible within a focal plane 1 with three pitch attitudes being shown:

0 degree inclination angle;

+10 degree inclination angle; and

−10 degree inclination angle.

The known system of pitch attitude symbols 4 in accordance with the state of the art, is shown as a virtual image. In focal plane 1, a horizon line 2 is shown which is congruent with the natural horizon line. When the helicopter is controlled in horizontal flight, the aircraft symbol, 3 fixed in focal plane 1, is almost congruent with the horizon line 2 which is also known as the neutral line. At a positive pitch angle $\Theta$ (10 degrees) of the helicopter, the horizon line 2 moves below the aircraft symbol 3. With a negative pitch angle $\Theta$ (−10 degrees), the horizon line 2 would move above the aircraft symbol 3. FIG. 1 thus represents the state of the art. If the display surface 20 is positioned below the longitudinal axis X and thus below the horizon line 2, the system of pitch attitude symbols can no longer be displayed during horizontal flight. It is the object of the invention to remedy this disadvantage in the state of the art.

The invention requires a head-up display unit which is explained for use in a helicopter. In the present example, the head-up display unit comprises for example at least one laser, an image modulator, a beam splitter, a projection hologram and a representation hologram. A projection hologram and representation hologram are advantageous. The representation hologram corresponds to the display surface area 20 (the HUD); it is contained on a film which can be arranged on the cockpit window 5 of the helicopter. However, the invention can also be realized if instead of the film, the optically semi-transparent screen which has commonly been used up to now, is used. To be sure, the film is more efficient in use. The pilot's view is directed forward, through the cockpit windscreen. Thus the film can be arranged somewhat below the longitudinal axis X of the helicopter. This is to provide ergonomic support for the slightly lowered direction of view, in particular during the approach for landing.

With this head-up unit, a virtual, spatial image is generated which is shown from the point of view of the pilot, in the direction of the longitudinal axis X behind (outside) the cockpit windscreen in the focal plane. This virtual image corresponds to a displayed pitch attitude symbol of the helicopter with an associated angular-degree scale.

Figure 2:
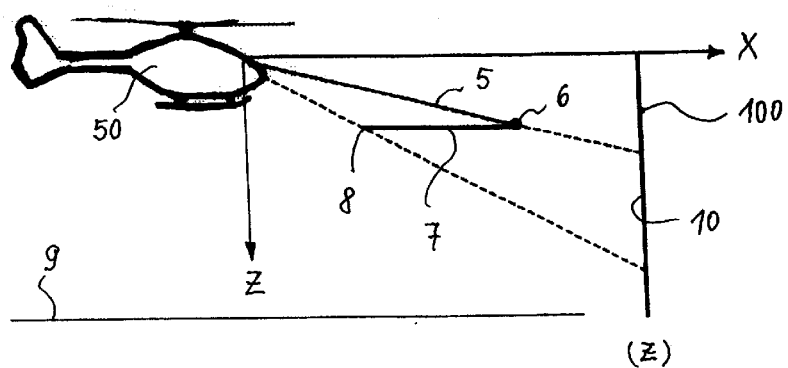
FIG. 2 shows geometric relationships at the pitch attitude representation area at a pitch angle $\Theta=0°$.

By means of FIG. 2 the principle of pitch attitude display is explained, i.e. the system of pitch attitude symbols is explained and shown, using a virtual plane. Because it always aligns itself parallel to the surface of the earth, this virtual plane is referred to as the pitch attitude representation area 7.

In this context, an explanation of the helicopter's co-ordinate system will assist comprehension. Said co-ordinate system is based on the point of sight of the pilot sitting in the cockpit of the helicopter 50. The longitudinal axis X and correspondingly, the vertical axis Z are shown. The rear edge 6 of the virtual area, which is referred to as the pitch attitude representation area 7, is located at the end point of the invisible reference line 5 which is at a constant angle and at a constant length within the helicopter's co-ordinates system. The rear edge 6 is also the fixed imaginary rotary axis of the virtual area. The front edge 8 of the virtual pitch attitude representation area 7 can move freely. When the pitch attitude changes, the virtual pitch attitude representation area 7 basically aligns itself such that it is always positioned horizontal (parallel) to the surface of the earth 9. The pilot views the virtual pitch attitude representation area 7 in two dimensions. As a symbol of the pitch attitude, the pilot sees a pitch attitude representation area 7 which corresponds to the projection 10 of the virtual area 7 on a focal plane 100 in the Z-plane. The four corners of the pitch attitude representation area 7 can be stated as angles relative to the pilot's point of sight.

Figure 2A:
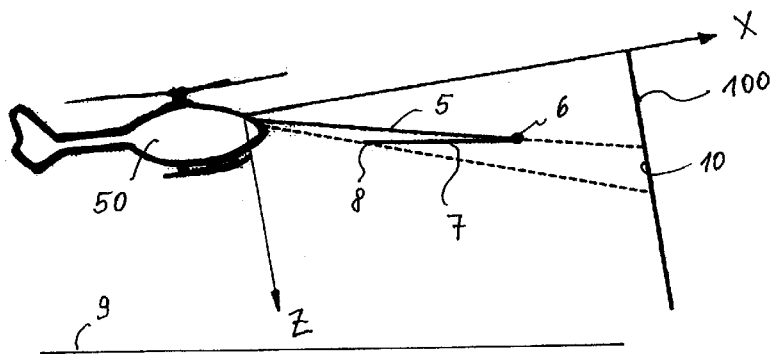
FIG. 2a shows geometric relationships at the pitch attitude representation area, with the helicopter pitching up.
Figure 2B:
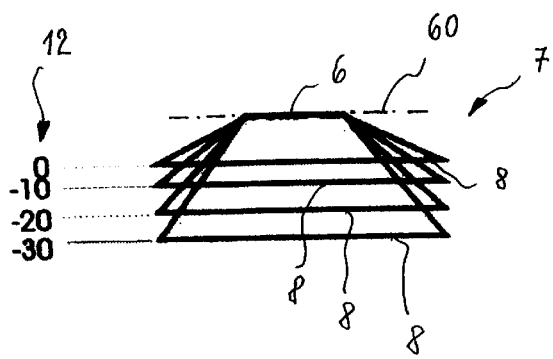
FIG. 2b is a view of the pitch attitude representation area as seen by the pilot looking out of the helicopter, for different pitch angles $\Theta$.

FIG. 2a shows a flight attitude which is characterized by a slight upward pitch of the helicopter. Although the size and geometry of the virtual pitch attitude representation area 7 is constant, the pilot experiences a change in the geometry of the projection 10. Thus from the point of view of the pilot, the position of the virtual pitch attitude representation area 7 changes. The image of the pitch attitude representation area 7 tilts upward within the focal plane, in relation to the neutral position, on the tilt axis 6. By contrast if the helicopter were to pitch downwards, the pitch attitude representation area 7 would tilt downwards on the focal plane 100. Such a situation of tilting of the pitch attitude representation area 7 is shown in FIG. 2b. Tilting takes place on the rear edge 6 which coincides with a fixed imaginary rear edge axis 60. A superimposed angular-degree scale 12 indicates the change in projection 10 of the area geometry of the pitch attitude representation area 7, depending on individual pitch angles Θ between 0° and −30°. The front edge 8 of the pitch attitude representation area 7 acts as an indicator. FIG. 2b shows the projection 10 of the pitch attitude representation area 7 onto the focal plane 100 as seen by the pilot.

Figure 3:
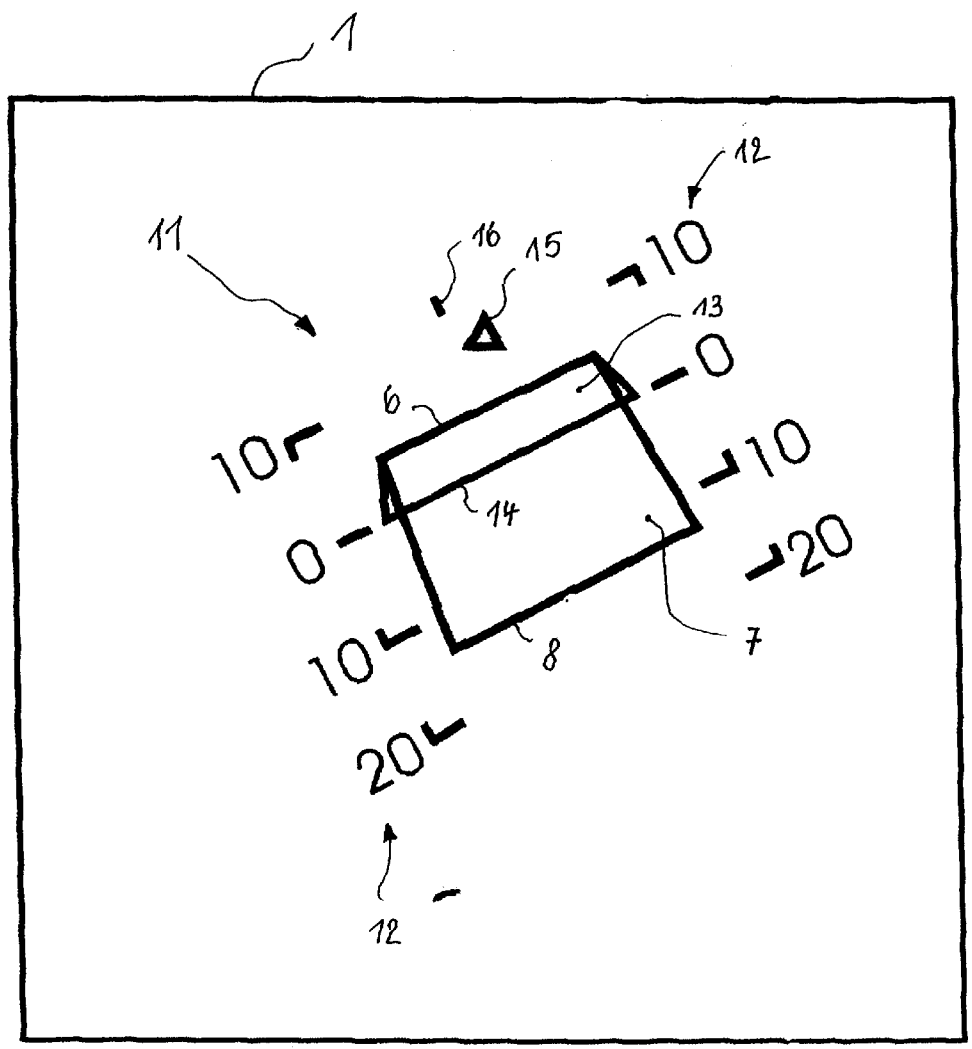
FIG. 3 shows an advantageous system of pitch attitude symbols.

To allow the pilot to make an immediate comparison with the neutral flight attitude whenever there is a change in flight attitude, a second virtual area is shown. This second virtual area is fixed in the display. This virtual area is referred to as the fixed zero position reference area. The fixed zero position reference area does not change; it shows the geometry of the projected area at a flight attitude of 0°. The rear edge of the fixed zero position reference area coincides with the tilt axis of the flight attitude display area. FIG. 3 shows such a representation. A system of pitch attitude symbols 11 is shown within a focal plane 1, which corresponds to a representation area; said system of pitch attitude symbols 11 showing the pitch attitude of the air vehicle. FIG. 3 shows an advantageous embodiment of the invention.

The movable area is the pitch attitude representation area 7. It is a locally movable symbol. The front edge 8 of the pitch attitude representation area 7 shows the pilot the present pitch angle Θ of the helicopter. This pitch angle can be read from the angular-degree scale 12 located either side. The front edge 8 thus functions as an indicator of the current pitch attitude.

The fixed area is the fixed zero position reference area 13. Its rear edge is identical with the rear edge 6 of the pitch attitude representation area 7. Since the zero position reference area 13 is fixed, its front edge 14 is also fixed. The front edge 14 represents the neutral line.

The frame of the fixed zero position reference area 13 can for example be shown in the color orange. Brightness can diminish by 50% towards the rear, to enhance transparency (and thus the impression of perspective). The frame of the pitch attitude representation area 7 can for example be shown in the color green, with the brightness of this frame also diminishing by 50%, so as to enhance transparency. The angular-degree scale 12 is arranged to the left and right of the system of pitch attitude symbols 11. Advantageously, the angular-degree scale 12 comprises gradations of 10°. The gradations for −10°, 0° and +10° are always shown, with further gradations being shown only when required. In this way only that information is shown which is necessary to keep the focal plane 1 uncluttered. The vertical lines on the scale markings point in the direction of the neutral line. In this way it is always clear in which direction control of the aircraft is required to return to the neutral flight attitude. The markings in the positive range are for example blue, while in the negative range they are for example brown.

Above the pitch attitude representation area 7 there is a triangle symbol to indicate the roll angle. Above it there is a vertical line 16. The line 16 rotates together with the virtual areas 7, 13. The triangle 15 maintains its absolute position on the image plane 1 when the helicopter rolls. The system of roll attitude symbols is for example shown in yellow.

The pitch attitude representation area 7 (preferably however the pitch attitude representation area 7 in conjunction with the fixed zero position reference area 13 and the angular-degree scale 12), constitute the system of pitch attitude symbols 11.

FIG. 4 diagrammatically shows the geometric interrelationships for deriving the pitch attitude representation area 7.

The geometric interrelationship for calculating the vertical angles (on the Y-axis of the helicopter's coordinates system) are shown in FIG. 4.

The result is:

$$\beta = \alpha + \arcsin\frac{t \cdot \sin(\alpha + \Theta)}{c}$$

where $$c = \sqrt{t^2 + e^2 - 2 \cdot t \cdot e \cdot \cos(\alpha + \Theta)}.$$

β is defined within the described co-ordinates system of the helicopter. It denotes the vertical position of the front edge of the surface (around the Y-axis). By way of α a the position of the rear edge is also defined in the helicopter's coordinates system.

For the horizontal angles (around the X-axis), if the horizontal planes are seen from the point of sight to the front edge or rear edge of the area, then the following equations apply to the horizontal angles according to FIG. 4:

Horizontal angle of front edge: $\delta_c/2 = \arctan\left(\frac{s}{2 \cdot c}\right)$ Horizontal angle of rear edge: $\delta_e/2 = \arctan\left(\frac{s}{2 \cdot e}\right)$ The equations stated above refer to a pure pitch movement. The roll movement is realized by rotating the entire system of symbols around the center of the rear edge 6.

The variables used and their significance as well as any initialization values are provided in the following table. The initialization values were determined by experiment; they can be adapted as required. The initialization values determine the position and size of the system of symbols.

| Variable | Meaning | Initialization Value |
| --- | --- | --- |
| C | Distance between point of sight and front edge | — |
| Θ | Pitch attitude of helicopter (vertical section) | initial value |
| B | Angle between neutral line of sight and line of sight toward front edge (vertical section) | — |
| $\delta_e$ | Angle between line of sight toward left and right rear edge (horizontal section) | — |
| $\delta_c$ | Angle between line of sight toward left and right front edge (horizontal section) | — |
| s | Surface width | 900 m |
| t | Surface length | 2000 m |
| e | Distance between point of sight and rear edge | 16,000 m |
| α | Angle between neutral line of sight and line of sight toward rear edge (vertical section) | −5° |

The equations for the representation are thus known.

FIG. 5 is an arrangement of the system of pitch attitude symbols 11 according to the invention in the focal plane 100, with three different pitch attitudes shown. Compared to the arrangement shown in FIG. 1 the display area 200 is in a lower position.

The system of pitch attitude symbols 11 comprises at least one virtual pitch attitude representation area 7 located in front of the helicopter and aligned parallel to the surface of the earth. The position of this virtual pitch attitude representation area 7 on the focal plane 100 can be selected as desired. The geometry of this virtual pitch attitude representation area 7 and an additional angular-degree scale 12 make it possible for the pilot to interpret the pitch attitude without any doubt.

The virtual pitch attitude representation area 7 is tiltable on a fixed tilt axis. This fictitious fixed tilt axis is identical to the rear edge 6 of the virtual area 7 shown. Arranging the fictitious tilt axis in the rear edge 6 provides the advantage that negative pitch angles can be displayed downwards in the focal plane 1. The pitch angles at 10 degrees and −10 degrees show the change in the geometry of the pitch attitude representation area 7 when compared to the neutral flight attitude, at 0 degree.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system of pitch-attitude symbols generated by a head-up display unit of an aircraft, comprising:

a system of pitch-attitude symbols represented as a virtual image via the head-up display in a flight direction behind a cockpit windshield in a focal plane in front of a background; and wherein within the focal plane, the system of pitch-attitude symbols includes at least one pitch-attitude representation surface area shown in perspective and always orientable parallel to an earth's surface, a rear edge of the pitch-attitude representation surface area being fixed to pivot in a rear-edge axis such that the pitch-attitude representation surface area is pivotable about the rear edge in the focal plane, and wherein a front edge of the pitch-attitude representation surface area indicates a pitch-attitude relative to an angular-degree scale.

2. The system of pitch-attitude symbols according to claim 1, wherein the pitch-attitude representation surface area is representable with a zero-position reference surface area, a rear edge of the zero-position reference surface area coinciding with said rear edge of the pitch-attitude representation surface area, wherein the zero-position reference surface area is stationary and indicates, with a front edge thereof, a position of a neutral line.

3. The system of pitch-attitude symbols according to claim 1, wherein said system of pitch-attitude symbols is freely positionable within the focal plane.

4. A pitch-attitude instrument for an aircraft having a cockpit windshield, comprising:

a head-up display device that represents a pitch-attitude symbology as a virtual image in a flight direction behind the cockpit windshield, said virtual image being in an image plane arranged outside of the cockpit windshield;

wherein the pitch-attitude symbology is formed from at least one pitch-attitude display surface shown in perspective and being always orientable parallel to an earth's surface, a rear edge of the pitch-attitude display surface being fixed to pivot about a rear-edge axis such that the pitch-attitude display surface pivots about the rear edge in the image plane, and a front edge indicates a pitch attitude relative to an angular-degree scale indicated on the pitch-attitude symbology.

5. The instrument according to claim 4, further comprising a neutral line as part of the pitch-attitude symbology, wherein the pitch-attitude display surface is representable with a zero-position reference surface, a rear edge of which coincides with the rear edge of the pitch-attitude display surface, and further wherein the zero-position reference surface is stationary and indicates a position of the neutral line with a front edge thereof.

6. A method of determining a pitch-attitude of an aircraft using a head-up display, the method comprising the acts of:

creating a pitch-attitude symbology via the head-up display as a virtual image in a flight direction behind a cockpit windshield in an image plane in front of a background viewing area;

within said image plane, forming the pitch-attitude symbology from at least one pitch-attitude display surface, a rear edge of the pitch-attitude display surface being fixed to pivot about a rear-edge axis so that the pitch-attitude display surface is pivotable about the rear edge in the image plane;

showing in perspective the pitch-attitude display surface such that it is always oriented parallel to a surface of the earth; and indicating the pitch-attitude using a front edge of the pitch-attitude display surface relative to an angular-degree scale provided with the pitch-attitude symbology.

7. The method according to claim 6, further comprising the acts of:

representing the pitch-attitude display surface with a zero-position reference surface, a rear edge of the zero-position reference surface coinciding with the rear edge of the pitch-attitude display surface; and maintaining the zero-position reference surface stationary and indicating a position of a neutral line in the pitch-attitude symbology using a front edge of the zero-position reference surface.

* * * * *